T. BRENNAN.
FEED BAG.
APPLICATION FILED JUNE 19, 1908.
939,971.
Patented Nov. 16, 1909.
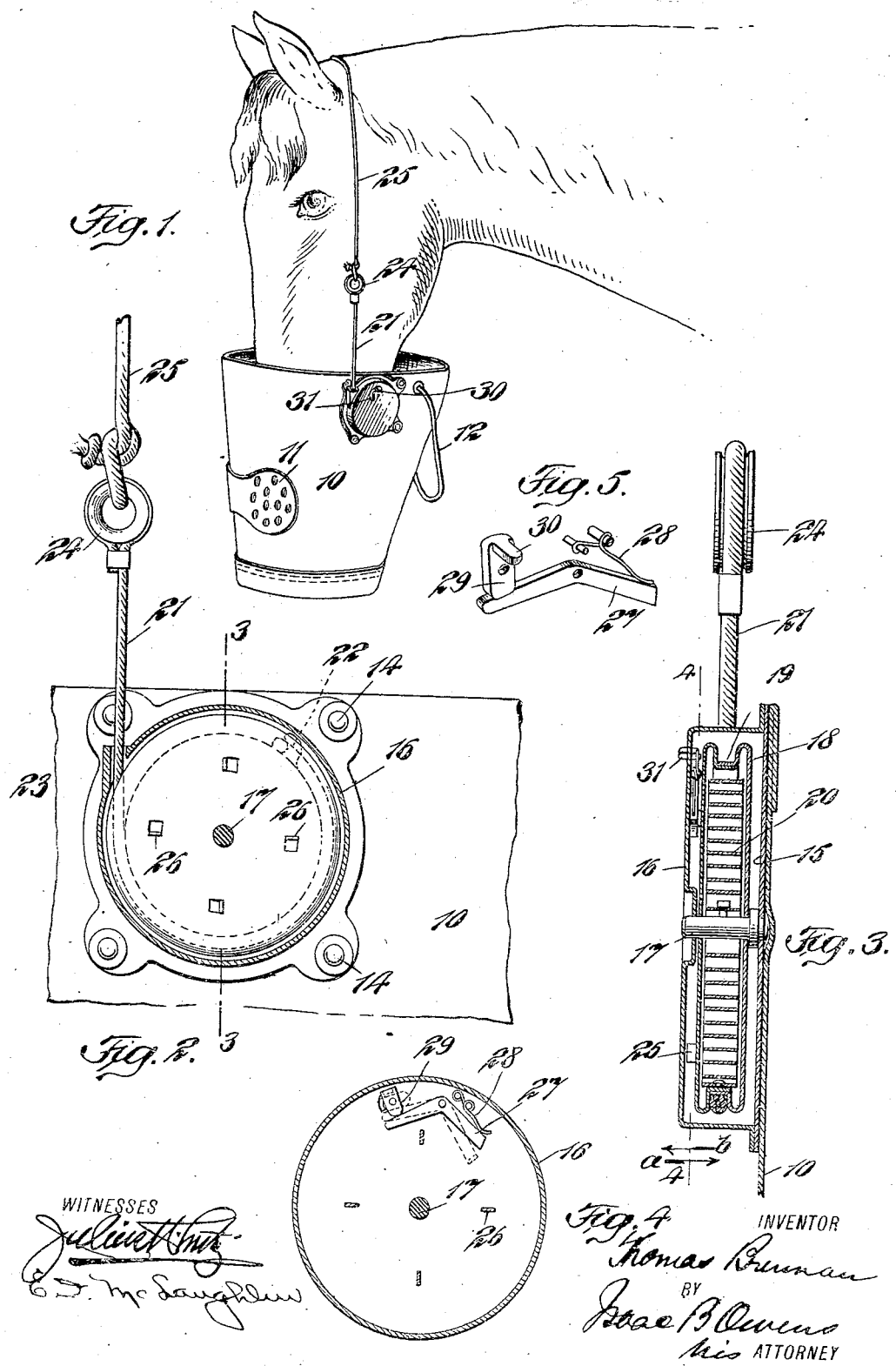

UNITED STATES PATENT OFFICE.

THOMAS BRENNAN, OF NEW YORK, N. Y.

FEED-BAG.

939,971.  Specification of Letters Patent.  Patented Nov. 16, 1909.

Application filed June 19, 1908. Serial No. 439,300.

*To all whom it may concern:*

Be it known that I, THOMAS BRENNAN, of the city of New York, borough of Manhattan, county and State of New York, have invented certain new and useful Improvements in Feed-Bags, of which the following is a full, clear, and exact specification, such as will enable others skilled in the art to which it appertains to make and use the same.

The object of my invention is to provide a feed bag which will automatically lift itself as the horse consumes the feed, thus keeping the feed properly in reach of the horse and avoiding causing the horse to throw its head and spill the feed. I attain this end by certain novel features of construction and combinations of parts which will be fully set forth hereinafter, and particularly pointed out in the claims.

Reference is had to the accompanying drawings in which,

Figure 1 is a view showing the device in use; Fig. 2 is a section on the line 4—4 of Fig. 3; in the direction of the arrow *a;* Fig. 3 is a section on the line 3—3 of Fig. 2; Fig. 4 is a section on the line 4—4 of Fig. 3 looking in the direction of the arrow *b;* and Fig. 5 is a detail perspective of the dog.

The bag 10 is preferably of the usual construction fitted with an air supply device 11 and the usual bale cord 12. At each side of the bag directly adjacent to its upper edge is fastened by rivets 14 a casing composed of a bag and plate 15 and a shell 16. These parts are held together by the rivets 14 or other suitable means and are preferably formed of sheet metal. Fastened centrally in the casing is a pin 17 on which is arranged within the casing a bobbin 18. This is preferably formed of two uniform circular sections pressed together and providing a peripheral groove 19. Within the bobbin is arranged a spiral spring 20 one end of which is fastened to the shaft 17 and the other end to the bobbin. The bobbin turns freely on the pin and received in its groove 19 is a cord 21, one end of which is fastened to a lug or the like 22 secured to the bobbin and the other end of which passes out through a tangentially disposed opening 23 and is provided with a ring 24 adapted to be connected to a cord 25 as shown in Figs. 1 and 2. This cord passes over the head of the horse and the bag is in this manner suspended, springs 20 tending to wind the cords 21 on the bobbins and thus gradually raise the bag as the horse eats the food.

Struck up from the outer side of the bobbin are a number of lugs 26 with which co-act dogs 27. These dogs are one for each casing and are preferably of elbow form. They are pivoted intermediate their ends to the inside of the outer walls of the casings and are pressed at one end by springs 28 serving to throw them into the path of the lugs 26 and when in active position these dogs give to allow rotation of the bobbins in winding the cords 21 thereon, but upon reverse motion of the bobbins they engage the lugs and stop such motion. The dogs are adapted to be thrown into inactive position by means of cams 29 which are pivoted to the under sides of the outer walls of the casings and have finger pieces 30 projecting through arc-shaped slots 31 in the casings. By these finger pieces the cams may be operated to throw the dogs in and out of action at will.

In the operation of the device the dogs are first thrown out of action and the cords 21 drawn out of the casings so that the bag may be placed upon the head of the horse. The cams are then operated to release the dogs and allow them to move into action. The springs now gradually raise the bag as the feed is consumed and the dogs prevent the bag from dropping so that should the horse rear its head the bag will not fly out and spill the feed, but will retain its position insuring that all of the feed is retained.

The device is simple in construction and the peculiar construction which I provide enables me to make the device at a low cost.

Having thus described my invention, what I claim as new and desire to secure by Letters Patent of the United States is:

A feed bag attachment comprising a casing adapted to be fastened to the bag, a pin or shaft mounted in said casing, a hollow bobbin revolubly mounted on said shaft and within the casing, a cord wound over the bobbin and projecting through an opening in the casing, lugs projecting outward from the side of the bobbin arranged concentric to the said shaft, a dog pivotally mounted within and on the casing and having its end movable in and out of the path of the said lugs, a spring for pressing the dog into the path of the lugs and a manually operative cam coacting with the dog to move it out of the path of the lugs against the action of the spring.

In testimony whereof I have signed my name to this specification in the presence of two subscribing witnesses.

THOMAS BRENNAN.

Witnesses:
  ISAAC B. OWENS,
  E. I. MCLAUGHLIN.